US008743488B2

(12) United States Patent
Keicher et al.

(10) Patent No.: US 8,743,488 B2
(45) Date of Patent: Jun. 3, 2014

(54) PRISM MOUNT FOR A LASER DEPOSITION DEVICE

(76) Inventors: Dave Keicher, Albuquerque, NM (US); Ed Tucker, Albuquerque, NM (US); Gregory Thomas Krause, Indianapolis, IN (US)

(*) Notice: Subject to any disclaimer, the term of this patent is extended or adjusted under 35 U.S.C. 154(b) by 0 days.

(21) Appl. No.: 12/834,164

(22) Filed: Jul. 12, 2010
(Under 37 CFR 1.47)

(65) Prior Publication Data
US 2011/0235199 A1   Sep. 29, 2011

Related U.S. Application Data

(63) Continuation of application No. 12/643,767, filed on Dec. 21, 2009, now abandoned, which is a continuation of application No. PCT/US2008/008013, filed on Jun. 26, 2008.

(60) Provisional application No. 60/937,216, filed on Jun. 26, 2007.

(51) Int. Cl.
*G02B 5/04* (2006.01)

(52) U.S. Cl.
USPC .......................................................... 359/831

(58) Field of Classification Search
USPC .......................................................... 359/831
See application file for complete search history.

(56) References Cited

U.S. PATENT DOCUMENTS

| | | | |
|---|---|---|---|
| 2,400,401 A | 4/1943 | Eckerman et al. | |
| 4,571,028 A * | 2/1986 | Ziegler et al. | 359/833 |
| 4,825,034 A | 4/1989 | Auvert et al. | |
| 5,597,589 A | 1/1997 | Deckard | |
| 5,837,960 A | 11/1998 | Lewis et al. | |
| 5,876,550 A | 3/1999 | Feygin et al. | |
| 6,355,086 B2 | 3/2002 | Brown et al. | |
| 6,429,982 B2 | 8/2002 | Bolt | |
| 6,694,207 B2 | 2/2004 | Darrah et al. | |
| 2002/0041420 A1 | 4/2002 | Garner | |
| 2002/0162825 A1 | 11/2002 | Lizotte et al. | |

(Continued)

FOREIGN PATENT DOCUMENTS

EP           0416852 A2      4/1990

OTHER PUBLICATIONS

International Search Report and Written Opinion, Sep. 17, 2008, PCT/US08/08013.

(Continued)

*Primary Examiner* — Jade R Chwasz
(74) *Attorney, Agent, or Firm* — Krieg DeVault LLP

(57) ABSTRACT

An apparatus includes a prism mount that retains a prism. The mount includes a ledge that engages a first side of the prism, a support surface structured that engages a second side of the prism, a retaining member that slidably engages a third side of the prism, and a biasing member that biases the retaining member to an engaged position with the prism. The mount further includes a slot disposed between the ledge and the support surface. The retaining member includes a machine screw, and a nut confines the biasing member between the nut and a prism mount body. The biasing member is retained in a counterbore in the prism mount body, and an end of the machine screw protrudes from the counterbore. The prism mount body further includes an alignment slot at a fixed azimuthal angle, and the laser deposition device includes a protrusion that engages the alignment slot.

23 Claims, 7 Drawing Sheets

(56) References Cited

U.S. PATENT DOCUMENTS

| | | |
|---|---|---|
| 2004/0204785 A1 | 10/2004 | Richardson |
| 2006/0134347 A1 | 6/2006 | Chiruvolu et al. |
| 2006/0158708 A1 | 7/2006 | Hocheng et al. |
| 2006/0215246 A1 | 9/2006 | Kerekes et al. |

OTHER PUBLICATIONS

Supplementary European Search Report, Jul. 11, 2012, EP 08768819.

Singapore Examination Report, Jun. 26, 2008, Application No. 200908574-7.

\* cited by examiner

US 8,743,488 B2

PRISM MOUNT FOR A LASER DEPOSITION DEVICE

CROSS REFERENCE

The present application is a continuation of U.S. patent application Ser. No. 12/643,767, filed Dec. 21, 2009, which is a continuation of PCT Patent Application No. PCT/US2008/008013, filed Jun. 26, 2008, which claims the benefit of U.S. Patent Provisional Application No. 60/937,216, filed Jun. 26, 2007, each of which is incorporated herein by reference. The present application is related to United States Patent Application entitled "System, method, and apparatus for repair of components" filed Jun. 12, 2008 and United States Patent Application entitled "System and method for component material addition" filed Jun. 9, 2008; both applications are incorporated herein by reference.

TECHNICAL FIELD

The present application generally relates to laser deposition systems, and more particularly, but not exclusively, to laser powder deposition systems having devices for application of laser energy in challenging spaces.

BACKGROUND

The use of prisms as final focusing optics in laser deposition devices provide certain advantages over ordinary or coated lenses. However, the use of prisms introduce certain challenges. Prisms are fragile and may be damaged during use or through differential thermal expansion relative to other components in the laser deposition devices. Prisms may require intermittent changing, the changing may occur in a sealed environment with an operator utilizing gloves and few tools. Accordingly, there is a demand for further contributions in this area of technology.

SUMMARY OF THE INVENTION

One embodiment of the present application is a unique prism mounting device. Other embodiments include apparatuses, systems, devices, hardware, methods, and combinations for mounting and changing prisms used in laser deposition devices. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
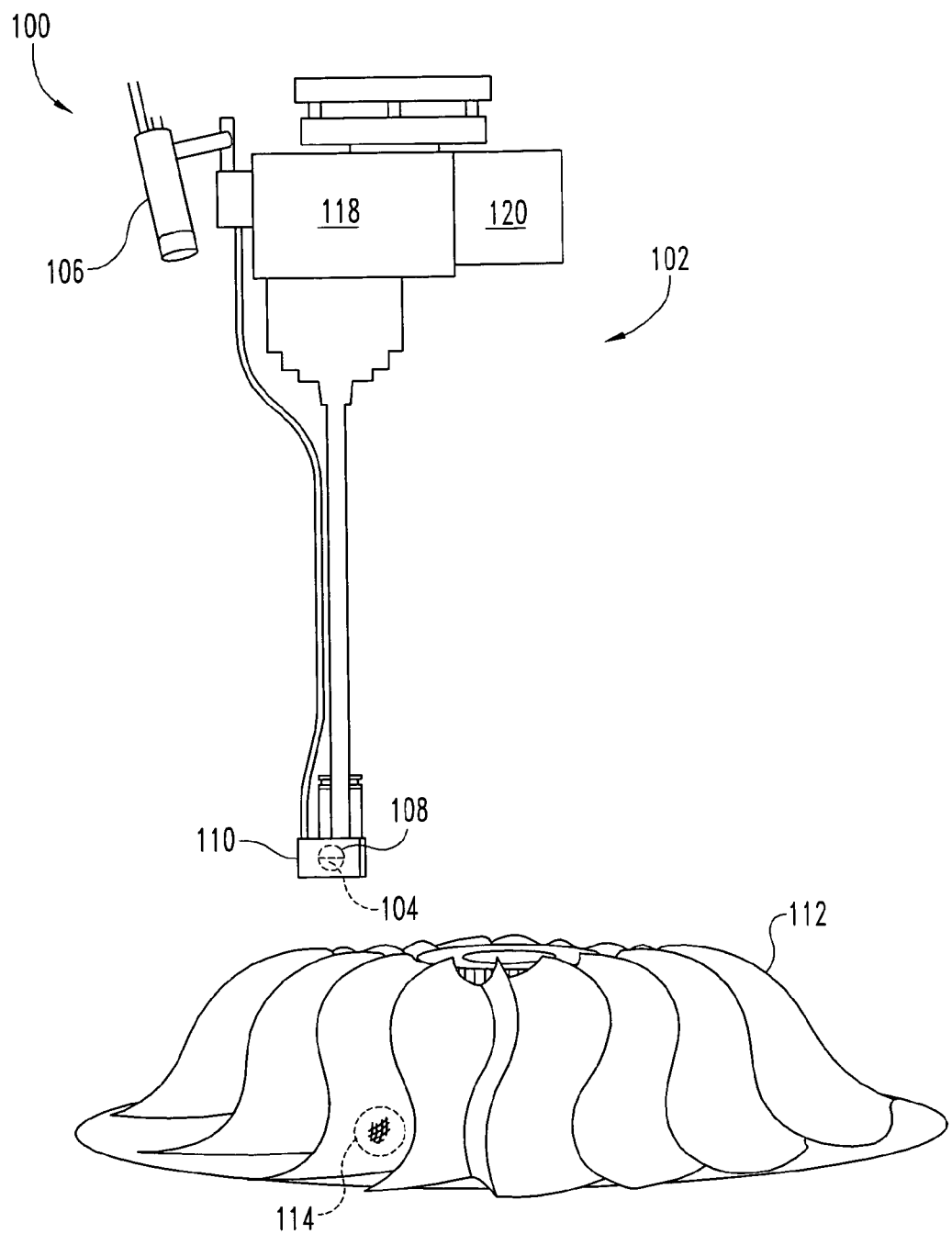
FIG. 1 depicts a system including a laser deposition device and a prism mount.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention is a laser deposition device that produces a molten pool in the deposition process. In one form the deposition device includes a small arm and a removable prism mount and is operable for reaching into relatively tight spaces, such as between two blades formed in a gas turbine engine blisk. A prism is located in the removable prism mount and acts as a beam directing optics for the laser beam. The prism is near the focal point of the laser beam and can be held in place in a way that the prism can heat and cool without being stressed by differential thermal expansion or contraction relative to the surrounding mount and deposition device. Additionally, the prism can be held in precise alignment at the reflecting point of two perpendicular beam paths. In some embodiments the prism itself is very small with sharp, fragile edges. The deposition assembly allows the prism to be placed into the mount without the use of tools. Further, the prism mount functions as a unit that enables manual loading and changing of the prism head at the end of the arm while inside a glove box. In some embodiments there is no need for wrenches or machine screws to secure the prism mount in the proper alignment.

The term "aircraft" includes, but is not limited to, helicopters, airplanes, unmanned space vehicles, fixed wing vehicles, variable wing vehicles, rotary wing vehicles, hover crafts, and others. Further, the present inventions are contemplated for utilization in other applications that may not be coupled with an aircraft such as, for example, industrial applications, power generation, pumping sets, naval propulsion and other applications known to one of ordinary skill in the art.

FIG. 1 depicts a system 100 including a laser deposition device 102 and a prism mount 104. The laser deposition device 102 may be operatively coupled to a laser, for example a fiber laser 106 such as a YAG fiber laser, and a metal material delivery device 118. The metal material delivery device 118 may be a metal powder delivery device, a wire feed device, or other known metal delivery device. In one embodiment, the metal delivery device 118 is a titanium powder or titanium alloy powder delivery device that delivers metal powder to the deposition head 110 such that the powder is deposited on a bladed disk 112 at a non-conforming region 114. The laser deposition device 102, in certain embodiments, further includes a camera 120 that may be structured to view the non-conforming region 114 of a component 112 through the final focusing optics of the laser 106. The camera 120, in certain embodiments, allows operation of the deposition device 102 in confined areas where line of sight of a repair area is otherwise unavailable.

The laser deposition device 102 includes a prism mount 104 that retains a prism 108. The prism 108 provides final focusing optics for the laser deposition device 102. In certain embodiments, the prism 108 is a right-angle prism that turns an incident laser beam ninety degrees, although other prism angles are contemplated in the present application. The laser deposition device 102 includes a deposition head 110 that may be narrow and designed to fit in tight spaces. In certain embodiments, the deposition head 110 has a width narrower than a width between blades of a bladed disk 112, allowing deposition operations on a bladed disk 112 having a non-conforming region 114. The non-conforming region 114 is a region having a non-conformity that can be brought into conformance with a laser deposition operation, and it may be a region that is damaged, worn, mis-manufactured, having a manufacturing parameter that has changed since original manufacture, and/or that may be manufactured originally by a deposition operation of the deposition device 102. Further descriptions of the prism mount 104 for certain embodiments of the present application are presented in the descriptions referencing FIGS. 2 through 6.

Figure 2:
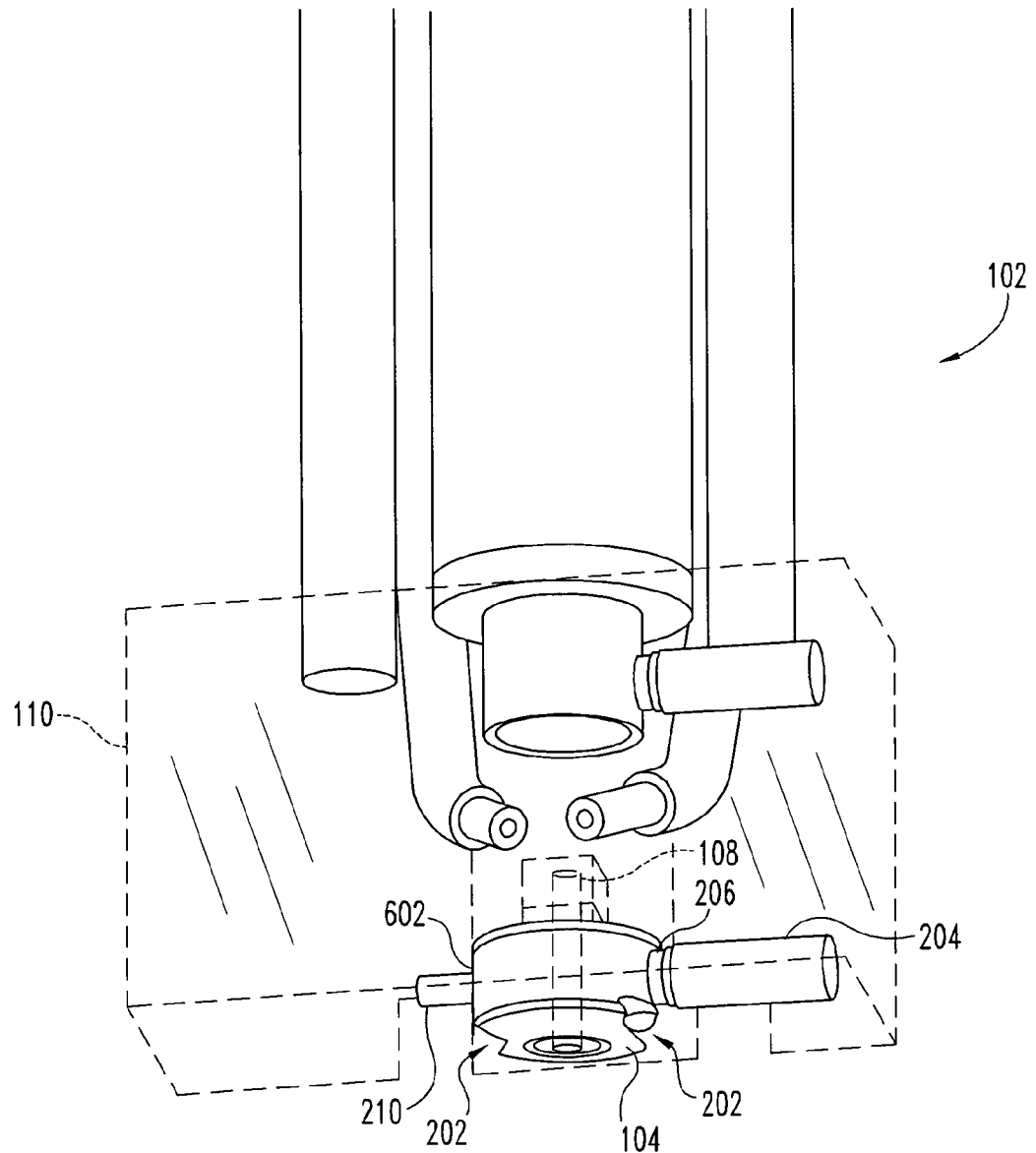
FIG. 2 is a side view of a prism mount installed in a laser deposition device.

FIG. 2 is a side view of a prism mount 104 installed in a laser deposition device 102. In certain embodiments, the prism mount 104 includes a holder 202 formed in a surface of the prism mount 104 and structured for grasping. For example, the holder 202 illustrated in FIG. 2 includes grooves and exposed ridges that allow a user to grasp the prism mount 104. In certain embodiments, the prism mount 104 has a prism mount body 208 that slidably engages the deposition device 102 ensuring concentric alignment of the prism mount 104 within the deposition device 102. In the illustration of FIG. 2, the deposition device 102 forms a sleeve to receive the prism mount 104 in a sliding vertical manner.

The deposition device 102, in certain embodiments, includes a prism mount body retainer 204 that engages a retaining groove 206 on the prism mount 104. The prism mount body retainer 204 is depicted as a ball-and-spring retainer in the illustration of FIG. 2, but the prism mount body retainer 204 may be a machine screw or other device to secure the prism mount 104. In certain embodiments, the holder 202 is pulled with enough force to overcome the ball-and-spring retainer 204 and release the prism mount 104 from the deposition device 102—for example while uninstalling the prism mount 104.

In certain embodiments, the deposition device 102 includes a protrusion 210 that engages an alignment slot (see description referencing FIG. 6 for an example of an alignment slot) on the prism mount body 208. In certain embodiments, the prism mount body 208 includes a detent, and the retaining groove 206 may be on the side of the prism mount 104 including the detent. The detent, the alignment slot, and/or both the detent and the alignment slot may provide azimuthal angle control allowing the prism mount 104 to be installed at an identical azimuthal angle for each installation, ensuring that the fiber laser 106 and the prism 108 are in the correct spatial relationship at each installation. Further, the azimuthal angle control maintains the relative positions of the prism 108 and the laser 106 as the deposition device 102 rotates during deposition operations.

As used herein, the azimuthal angle refers to the rotation angle of the prism mount 104 in the horizontal plane as depicted in FIG. 2, for example as the prism mount 104 would rotate if set flat on a surface, relative to the deposition device 102. However, the prism mount 104 may be installed in any orientation as required by the application, and the azimuthal angle for a given embodiment is merely a translated angle according to the angle of the installation for the embodiment.

Figure 3:
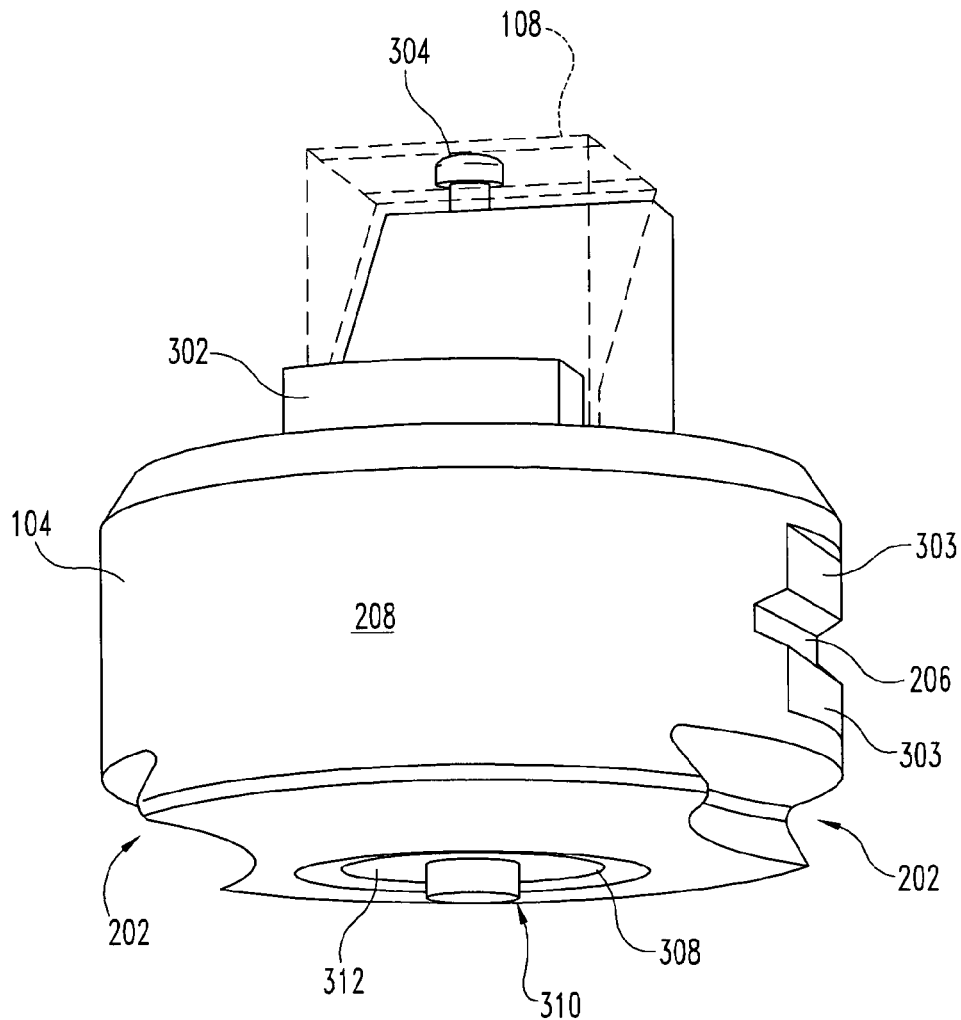
FIG. 3 is a first view of a prism mount.

FIG. 3 is a first view of a prism mount 104. In certain embodiments, the prism mount 104 includes a ledge 302 that engages a first side of the prism 108. The prism mount 104 includes a holder 202 formed in a surface of the prism mount 104 and structured for grasping. The prism mount body 208 is a cylindrical barrel in certain embodiments. In certain embodiments, the prism mount 104 includes a detent 303, or flattened area of the cylinder, which allows engagement of a retaining device from the deposition device 102. In certain embodiments, the prism mount body 208 further includes the retaining groove 206. A retainer 304, such as a machine screw engaging a surface of the prism 108, is illustrated in FIG. 3.

The retainer 304 may retain the prism 108 due to force applied by a biasing member, such as a spring or an o-ring(s) where the o-rings flex under applied force. In certain embodiments, the biasing member is retained in a counterbore 312 in the prism mount body 208, and an end 310 of the machine screw 304 extends from the prism mount body 208. The protruding end 310 of the machine screw 304 may be pressed, compressing the biasing member and releasing the prism 108 from the prism mount 104. The protruding end 310 of the machine screw may be released, allowing the biasing member to expand and to press the machine screw 304 against the prism 108. The biasing force allowable depends upon the properties of the prism 108, the expected expansion differential of the prism 108 and the prism mount 104, and similar parameters that may vary with specific embodiments. In certain embodiments, a biasing force of less than about 3 pounds-force is sufficient to hold the prism 108 without damaging the prism 108. In certain embodiments, a nut 308 confines the biasing member between the nut 308 and the prism mount body 208.

Figure 4:
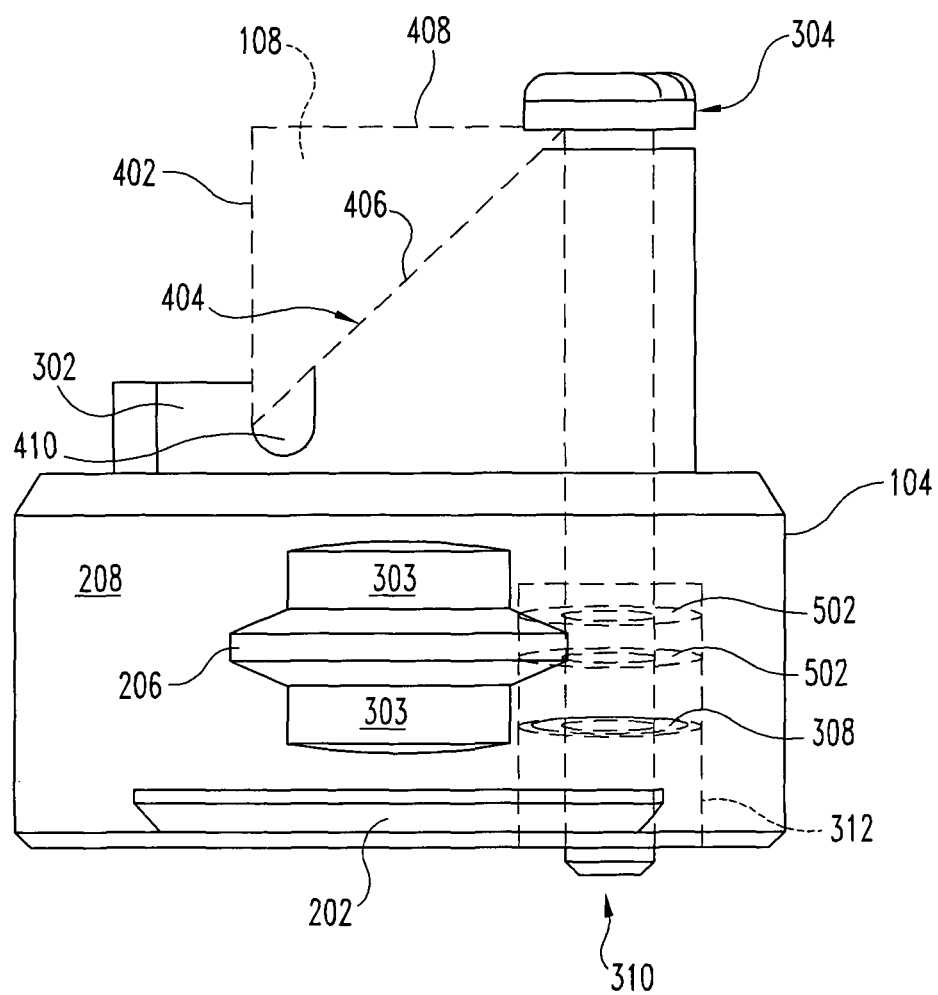
FIG. 4 is a second view of a prism mount.

FIG. 4 is a second view of a prism mount 104. The view of FIG. 4 illustrates the prism 104 from a side view. In certain embodiments, a ledge 302 engages a first side 402 of the prism 108, a support surface 404 engages a second side 406 of the prism 108, and a retaining member 304 slidably engages a third side 408 of the prism 108. The prism mount 104, in certain embodiments, further includes a slot 410 that is between the ledge 302 and the support surface 404. In certain embodiments, the slot 410 allows room for the prism 108 to expand or contract in the event of differential expansion or contraction relative to the prism mount 104, including where various locations of the prism mount 104 may not experience identical thermal expansion amounts due to temperature gradients. The slot 410 further provides space for the prism 108 to swivel out of the prism mount 104 without damage to the prism 108. In certain embodiments the ledge 302 and the support surface 404 are coupled to the prism mount body 208, and in certain embodiments the coupling may include the ledge 302 and support surface 404 being integrally formed with the prism mount body 208.

Figure 5A:
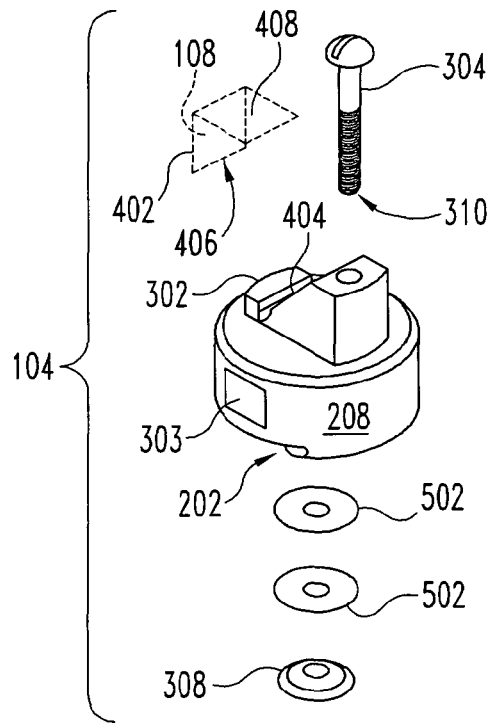
FIG. 5A is a first exploded view of a prism mount.
Figure 5B:
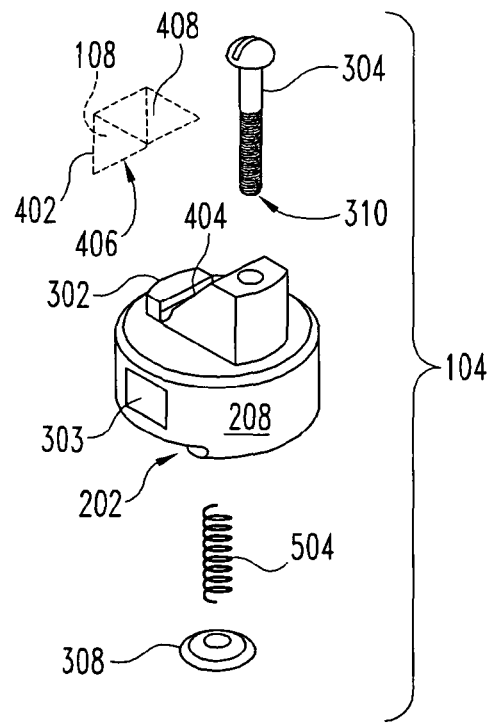
FIG. 5B is a second exploded view of a prism mount.

FIGS. 5A and 5B illustrate exploded views of a prism mount 104. FIG. 5A illustrates a prism mount 104 including o-rings 502 as a biasing member. The nut 308 confines the o-rings 502 between the nut 308 and the prism mount body 208, in one example the nut 308 applies some compression force on the o-rings 502 and thereby applying retentive force on the machine screw 304 to retain the prism 108. Pressing on the end 310 of the machine screw 304 compresses the o-rings 502 further and releases the prism 108, and subsequently releasing the end 310 of the machine screw 304 returns the o-rings 502 to a less compressed state, retaining a prism 108 if still present. FIG. 5B illustrates a spring 504 as a biasing member. The spring 504 operates similarly to the o-rings 502, and any other biasing member understood in the art may likewise be utilized in various embodiments.

Figure 6:
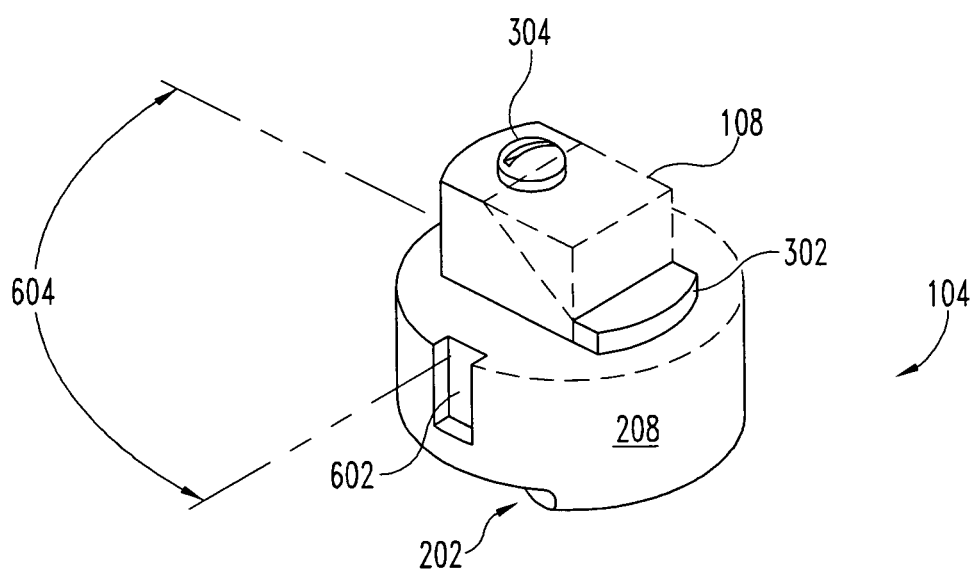
FIG. 6 is a third view of a prism mount.

FIG. 6 is a third view of a prism mount 104. The illustration of FIG. 6 shows an alignment slot 602 at a fixed azimuthal angle 604 on the prism mount 104. The reference angle for measuring the azimuthal angle 604 is arbitrary, and may be related to any component of the prism mount 104. In certain embodiments, the laser deposition device 102 includes a protrusion 210 (FIG. 1) that engages the alignment slot 602 thereby maintaining a constant azimuthal angle between the deposition device 102 and the prism mount 108. In certain embodiments, the alignment slot 602 may be on an opposite side of the detent 303, as illustrated in FIG. 6. However, the angle difference between the slot 602 and the detent 303 may be any angle, for example the angles may be determined by the arrangement of parts in the deposition device 102. In certain embodiments, the alignment slot 602 and the detent 303 may be utilized together or individually to maintain the constant azimuthal angle between the deposition device 102 and the prism mount 108. The alignment slot 602 may be termed a clocking slot.

Figure 7:
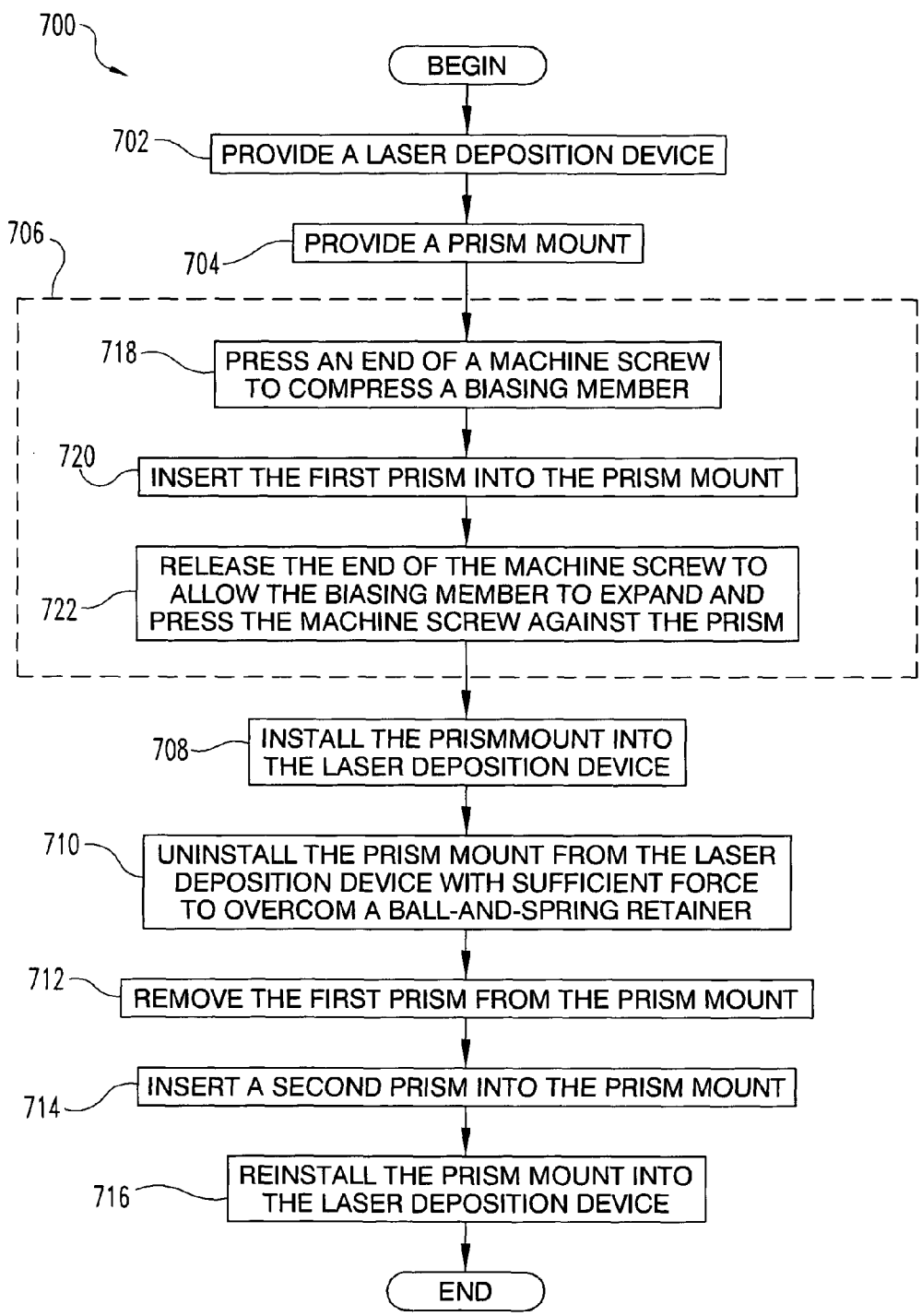
FIG. 7 is a schematic flow diagram of a procedure for changing a prism.

FIG. 7 is a schematic flow diagram of a procedure 700 for changing a prism 108. The procedure 700 includes an operation 702 to provide a laser deposition device, and an operation 704 to provide a prism mount. In certain embodiments, the procedure 700 further includes an operation 706 to insert a first prism into the prism mount, and an operation 708 to install the prism mount into the laser deposition device. The procedure 700 further includes an operation 710 to uninstall the prism mount from the laser deposition device, an operation 712 to remove the first prism from the prism mount, an operation 714 to insert a second prism into the prism mount, and an operation 716 to reinstall the prism mount into the laser deposition device. In certain embodiments, the operation 710 to uninstall the prism mount from the laser deposition device includes pulling the holder with sufficient force to overcome the ball-and-spring retainer.

In certain further embodiments, the operation 706 to insert a first prism into the prism mount includes an operation 718 to press the end of the machine screw to compress the biasing member, an operation 720 to insert the first prism into the prism mount, and an operation 722 to release the end of the machine screw to allow the biasing member to expand and press the machine screw against the prism.

In certain embodiments, an apparatus includes a prism mount which includes a prism mount alignment portion, a holder, a ledge, a prism retainer, a clocking slot, and a detent. A prism mount alignment portion is constructed as a cylindrical alignment barrel and operates to align the prism mount to be received by deposition device. The cylindrical alignment barrel enables repeatable concentricity alignment of the prism mount. The prism mount alignment portion can be constructed of other shapes, such as square or rectangular, depending on the particular application.

In certain embodiments, the holder is configured as a pinch slot and is used to provide structure through which the prism mount can be grasped by an instrument or by an operator's hand. In certain embodiments, the holder is formed as two semi-circular cut-outs in prism mount alignment portion, but other shapes are also contemplated. In addition, the holder may have only one cutout, or alternatively may have more than two cut-outs.

In certain embodiments, the ledge is configured to receive one end of prism and acts to limit movement of prism. The ledge allows for nearly complete use of the prism optical path for laser beam alignment.

In certain embodiments, a prism retainer is configured as a machine screw. The prism retainer acts in conjunction with the ledge to retain prism in a desired location relative to the prism mount. The ledge and prism retainer enable nearly complete use of the prism optical path for laser beam alignment. In certain embodiments, the prism retainer can be used to allow the prism to be selectively removed from prism mount and replaced with another prism.

In certain embodiments, alignment elements including a clocking slot and a detent are used to align the prism mount relative to the deposition device. The clocking slot enables repeatable clock position alignment (or azimuthal angle) of the prism mount relative to the deposition device. In certain embodiments, the clocking slot cooperates with structure internal to deposition device to align the prism mount and is shaped as an elongate cutout on the side of prism mount alignment portion. In certain embodiments, the prism mount may have more than one clocking slot.

In certain embodiments, the detent cooperates with structure internal to deposition device, for example a mount retention device, to align the prism mount. In one embodiment, the detent is depicted as a slot formed in the side of prism mount alignment portion transverse to the longitudinal axis of the cylindrical alignment barrel. The detent can take other forms such as a symmetrical depression in other embodiments. In still further embodiments, the detent and clocking slot may be merged into one feature. The detent can be formed to cooperate with a ball-and-spring assembly or a machine screw, as discussed hereinabove.

In certain embodiments, numerous features combine to collectively form alignment elements that act to align the prism mount relative to the deposition device. For example, the alignment features of the clocking slot, the prism mount alignment portion, the detent, and a mount retention device maintain precise prism mount and laser beam alignment after the prism is replaced in the prism mount and the prism mount is re-inserted into the deposition device. Other alignment features may also be added. The aforementioned alignment features maintain precise prism location for any rotational angle of the deposition device.

In certain embodiments, an o-ring is a Parker No. 2-004 Nitrile o-ring and is configured to be compliant, such that when the nut it tightened about the machine screw the o-ring is capable of being compressed. The illustrated embodiments depict two o-rings, but certain embodiments may have fewer, or more, than two. Operations to replace the prism may include pressing the nut or end of the machine screw toward the head of machine screw to further compress the o-ring(s) and thereby lift the head of the machine screw from the prism. Alternatively, operations to replace the prism may include removing the nut completely to allow the machine screw to be completely withdrawn from the prism mount body before removing the prism. The compliant retaining system disclosed above maintains beam location and prevents fracture of the prism, allowing for differential expansion and contraction of the prism and the prism mount. In addition, the compliant retaining system allows for adjustment of the load that retains the prism. Furthermore, the compliant retaining system allows for insertion of a fragile prism without chipping the edges of the prism. Other types of retainer systems are also contemplated herein. For example, the prism retainer may take the form of a magnetic coupling, or may be a metallic clip that attaches to prism mount.

As is evident from the text and figures presented above, a variety of embodiments according to the present invention are contemplated.

An apparatus includes a prism mount structured to retain a prism, the mount including: a ledge structured to engage a first side of the prism, a support surface structured to engage a second side of the prism, a retaining member structured to slidably engage a third side of the prism, and a biasing member that biases the retaining member to an engaged position with the prism. In certain embodiments, the prism mount further includes a slot disposed between the ledge and the support surface. In certain embodiments, the biasing member includes a spring and/or at least one o-ring. In certain embodiments, the retaining member includes a machine screw, and the prism mount further includes a nut confining the biasing member between the nut and a prism mount body. In certain embodiments, the biasing member is retained in a counterbore in the prism mount body, and an end of the machine screw protrudes from the counterbore.

In certain further embodiments, the biasing member provides a biasing load of less than about 3 pounds force. In certain embodiments, the prism mount further includes a prism mount body, and the ledge and the support surface are coupled to the prism mount body. In certain embodiments, the prism mount body further includes an alignment slot at a fixed azimuthal angle, and the laser deposition device comprises a protrusion structured to engage the alignment slot.

In certain further embodiments, the prism mount body includes a cylinder that slidably engages a laser deposition device, and an alignment slot at a fixed azimuthal angle, where the laser deposition device includes a protrusion structured to engage the alignment slot. In certain embodiments, the prism mount body further includes a detent and a retaining groove, and the laser deposition device includes a prism mount body retainer that engages the retaining groove. In certain further embodiments, the prism mount body retainer includes at least one of a ball-and-spring retainer and a machine screw retainer. In certain embodiments, the apparatus includes a holder formed in a surface of the prism mount and structured for grasping.

In certain exemplary embodiments, a prism mount is disclosed including a ledge structured to engage a first side of a prism, a support surface structured to engage a second side of the prism, and a retaining means to slidably engage a third side of the prism. In certain embodiments, the retaining means includes a retaining member and a biasing member. In certain embodiments, the retaining means further allows differential thermal expansion between the prism and the prism mount without damaging the prism. In certain embodiments, the prism mount includes an azimuthal angle control means that enforces a fixed azimuthal angle when the prism mount is inserted into a laser deposition device. In certain further embodiments, the azimuthal angle control means includes an alignment slot and/or a detent.

In certain embodiments, the azimuthal angle control means includes an alignment slot and a detent, and the laser deposition device includes a protrusion structured to engage the alignment slot. In certain further embodiments, the prism mount includes a retaining groove, and the laser deposition device further includes a prism mount body retainer that engages the retaining groove. In certain further embodiments, the retaining groove is formed on a side of the prism mount including the detent.

In certain exemplary embodiments, a system includes a laser deposition device operatively coupled to a fiber laser and a metal material delivery device, where the laser deposition device includes a prism mount structured to retain a prism. In certain embodiments, the mount includes a ledge structured to engage a first side of the prism, a support surface structured to engage a second side of the prism, a retaining member structured to slidably engage a third side of the prism, a biasing member that biases the retaining member to an engaged position with the prism, and a holder formed in a surface of the prism mount and structured for grasping. In certain embodiments, the system further includes a bladed disk including a non-conforming region.

In certain embodiments, the laser deposition device includes a deposition head having a width narrower than a width between blades of the bladed disk. In certain embodiments, the prism mount further includes a prism mount body, wherein the ledge and the support surface are coupled to the prism mount body, wherein the prism mount body comprises a cylinder that slidably engages a laser deposition device, wherein the prism mount body further comprises a detent and a retaining groove, wherein the laser deposition device includes a prism mount body retainer that engages the retaining groove, and wherein the prism mount body retainer comprises at least one of a ball-and-spring retainer and a machine screw retainer.

In one exemplary embodiment, a method includes providing a laser deposition device, and providing a prism mount. The prism mount includes a ledge structured to engage a first side of a prism, a support surface structured to engage a second side of the prism, a retaining member structured to slidably engage a third side of the prism, and a biasing member that biases the retaining member to an engaged position with the prism. In certain embodiments, the method further includes inserting a first prism into the prism mount, and installing the prism mount into the laser deposition device. In certain further embodiments, the prism mount further includes a holder formed in a surface of the prism mount and structured for grasping, and the method further includes uninstalling the prism mount from the laser deposition device, removing the first prism from the prism mount, inserting a second prism into the prism mount, and reinstalling the prism mount into the laser deposition device. In certain embodiments, the prism mount further includes a cylinder that slidably engages a laser deposition device, the prism mount body further includes a detent and a retaining groove, the laser deposition device includes a prism mount body retainer comprising a ball-and-spring retainer that engages the retaining groove, and the method further includes uninstalling the prism mount from the laser deposition device by pulling the holder with sufficient force to overcome the ball-and-spring retainer.

In certain further embodiments, the biasing member includes a spring and/or at least one o-ring, the prism mount further includes a nut confining the biasing member between the nut and a prism mount body, the biasing member is retained in a counterbore in the prism mount body, the retaining member includes a machine screw having an end that protrudes from the counterbore, and inserting a first prism into the prism mount includes pressing the end of the machine screw to compress the biasing member, inserting the first prism into the prism mount, and releasing the end of the machine screw to allow the biasing member to expand and press the machine screw against the prism.

In certain embodiments, and apparatus includes a removable prism mount including a prism mount alignment feature, and a prism retainer adapted to be received by the removable prism mount and configured to retain a prism. The apparatus further includes a holder formed in a surface of the removable prism mount and structured for grasping. In certain further embodiments, the apparatus includes a clocking slot and a detent structured to align the removable prism mount. In certain further embodiments, the apparatus further includes a ledge structured to receive a portion of a prism, where the ledge and the screw cooperate to retain the prism. In certain further embodiments, the prism is a right angle prism arranged such that the hypotenuse of the prism rests against a surface of the removable prism mount. In certain embodiments, the prism retainer includes a screw and a nut, with an o-ring and/or a spring. In certain further embodiments, the apparatus includes means for retaining the prism.

In certain embodiments, an apparatus includes a laser manipulation and powder delivery apparatus having a laser beam generator and an extension, and a prism cassette structured to be removably installed in the extension. The prism cassette includes an alignment portion to orient the cassette relative to the laser beam generator. In certain further embodiments, the apparatus further includes a prism mounted in the prism cassette. In certain embodiments, the apparatus includes a screw structured to be received by the prism cassette and configured to retain a prism.

In one exemplary embodiment, a method includes providing a laser powder deposition system, configuring a prism cassette to be releasably installed in the laser powder deposition system, where the prism cassette includes an alignment portion and a prism retainer, and installing the prism cassette in the laser powder deposition system. In certain embodiments, the method further includes removing the prism cassette and replacing the prism.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a prism mount structured to retain a prism that includes a vertex end that defines an acute angle formed between a first side and a second side of the prism wherein the first side forms an opposing face to the second side, the mount comprising:
a ledge structured to engage the first side of the prism;
a support surface located opposite the ledge and structured to engage the second side of the prism, wherein the ledge and support surface form a pocket into which can be received the prism when installed;
a retaining member structured to slidably engage a third side of the prism; and
a member that biases the retaining member to an engaged position with the prism and which produces a force that is transmitted from the member to the prism such that the vertex end of the prism is urged into the pocket formed by the ledge and the support surface.

2. The apparatus of claim 1, wherein prism mount further includes a slot disposed between the ledge and the support surface.

3. The apparatus of claim 1, wherein the biasing member comprises one of a spring and at least one o-ring.

4. The apparatus of claim 3, wherein the retaining member comprises a machine screw, and wherein the prism mount further comprises a nut confining the biasing member between the nut and a prism mount body.

5. The apparatus of claim 4, wherein the biasing member is retained in a counterbore in the prism mount body, and wherein an end of the machine screw protrudes from the counterbore.

6. The apparatus of claim 1, wherein the biasing member provides a biasing load of less than about 3 pounds force.

7. The apparatus of claim 1, wherein the prism mount further comprises a prism mount body, and wherein the ledge and the support surface are coupled to the prism mount body.

8. The apparatus of claim 7, wherein the prism mount body comprises a cylinder that slidably engages a laser deposition device.

9. The apparatus of claim 8, wherein the prism mount body further comprises an alignment slot at a fixed azimuthal angle, and wherein the laser deposition device comprises a protrusion structured to engage the alignment slot.

10. The apparatus of claim 8, wherein the prism mount body further comprises a detent and a retaining groove, and wherein the laser deposition device includes a prism mount body retainer that engages the retaining groove.

11. The apparatus of claim 10, wherein the prism mount body retainer comprises at least one of a ball-and-spring retainer and a machine screw retainer.

12. The apparatus of claim 1, further comprising a holder formed in a surface of the prism mount and structured for grasping.

13. A prism mount, comprising:
a ledge structured to engage a first side of a prism having an acute end defined by an acute angle formed between a first side of the prism and a second side of the prism wherein the first side forms an opposing face to the second side;
a support surface positioned opposite the ledge and structured to engage the second side of the prism, wherein the ledge and the support surface form a receiving space into which can be received the prism when installed; and
a retaining means to slidably engage a third side of the prism and that produces a retaining force such that the acute end of the prism is forced into the receiving space formed by the ledge and the support surface.

14. The prism mount of claim 13, wherein the retaining means includes a retaining member and a biasing member.

15. The prism mount of claim 13, wherein the retaining means further allows differential thermal expansion between the prism and the prism mount without damaging the prism.

16. The prism mount of claim 13, further comprising an azimuthal angle control means that enforces a fixed azimuthal angle when the prism mount is inserted into a laser deposition device.

17. The prism mount of claim 16, wherein the azimuthal angle control means includes at least one of an alignment slot and a detent.

18. The prism mount of claim 16, wherein the azimuthal angle control means includes an alignment slot and a detent, and wherein the laser deposition device includes a protrusion structured to engage the alignment slot.

19. The prism mount of claim 18, further comprising a retaining groove, and wherein the laser deposition device further includes a prism mount body retainer that engages the retaining groove.

20. The prism mount of claim 19, wherein the retaining groove is formed on a side of the prism mount including the detent.

21. A system, comprising:
a laser deposition device operatively coupled to a fiber laser and a metal material delivery device, wherein the laser deposition device includes a prism mount structured to retain a prism that includes a vertex end that defines an acute angle formed between a first side and a second side of the prism wherein the first side forms an opposing face to the second side, the mount comprising:
a ledge structured to engage the first side of the prism;
a support surface arranged opposite the ledge and structured to engage the second side of the prism, wherein the ledge and support surface form a pocket into which can be received the prism when installed;

a retaining member structured to slidably engage a third side of the prism;
a biasing member that biases the retaining member to an engaged position with the prism and which urges the vertex end of the prism into the pocket formed by the ledge and the support surface;
a holder formed in a surface of the prism mount and structured for grasping; and
a bladed disk including a non-conforming region.

22. The system of claim 21, wherein the laser deposition device includes a deposition head having a width narrower than a width between blades of the bladed disk.

23. The system of claim 21, wherein the prism mount further comprises a prism mount body, wherein the ledge and the support surface are coupled to the prism mount body, wherein the prism mount body comprises a cylinder that slidably engages a laser deposition device, wherein the prism mount body further comprises a detent and a retaining groove, wherein the laser deposition device includes a prism mount body retainer that engages the retaining groove, and wherein the prism mount body retainer comprises at least one of a ball-and-spring retainer and a machine screw retainer.

* * * * *